United States Patent
Dygert et al.

(10) Patent No.: US 11,001,431 B2
(45) Date of Patent: May 11, 2021

(54) CONTAINER SYSTEM AND METHOD OF MANUFACTURE

(71) Applicant: RING CONTAINER TECHNOLOGIES, LLC, Oakland, TN (US)

(72) Inventors: Douglas Miles Dygert, Olive Branch, MS (US); Douglas A. Woodring, Somerville, TN (US); Paul Vincent Kelley, Arlington, TN (US)

(73) Assignee: RING CONTAINER TECHNOLOGIES, LLC, Oakland, TN (US)

( * ) Notice: Subject to any disclaimer, the term of this patent is extended or adjusted under 35 U.S.C. 154(b) by 46 days.

(21) Appl. No.: 16/369,679

(22) Filed: Mar. 29, 2019

(65) Prior Publication Data

US 2020/0307888 A1 Oct. 1, 2020

(51) Int. Cl.
| | |
|---|---|
| *B65D 79/00* | (2006.01) |
| *B65D 1/02* | (2006.01) |
| *B65D 41/34* | (2006.01) |
| *B29C 49/06* | (2006.01) |
| *B29C 49/42* | (2006.01) |
| *B29L 31/00* | (2006.01) |
| *B29K 67/00* | (2006.01) |

(52) U.S. Cl.
CPC ............ *B65D 79/005* (2013.01); *B29C 49/06* (2013.01); *B29C 49/4273* (2013.01); *B65D 1/0207* (2013.01); *B65D 1/0246* (2013.01); *B65D 1/0276* (2013.01); *B65D 41/34* (2013.01); *B29K 2067/003* (2013.01); *B29L 2031/712* (2013.01); *B65D 2501/0036* (2013.01)

(58) Field of Classification Search
CPC .. B65D 79/005; B65D 1/0276; B65D 1/0246; B65D 1/023; B65D 1/0261; B65D 41/348; B65D 41/34; B65D 11/24; B65D 11/22
USPC ....... 215/381, 382, 376, 373, 372, 371, 254, 215/253, 252, 250, 329, 316, 44, 43; 220/672, 670, 669, 675, 624, 623, 609, 220/608, 604, 366.1; 264/526, 102
See application file for complete search history.

(56) References Cited

U.S. PATENT DOCUMENTS

| | | | | |
|---|---|---|---|---|
| 4,007,848 | A * | 2/1977 | Snyder | B65D 41/348 215/44 |
| 4,813,561 | A * | 3/1989 | Ochs | B65D 41/3409 215/252 |
| 4,842,153 | A * | 6/1989 | Hulon | B65D 59/00 206/523 |
| 5,178,289 | A * | 1/1993 | Krishnakumar | B65D 1/0223 215/382 |
| 5,198,248 | A * | 3/1993 | Krishnakumar | B29C 49/0073 215/373 |

(Continued)

FOREIGN PATENT DOCUMENTS

JP 62028335 A * 2/1987 ........... B65D 1/0276

*Primary Examiner* — Robert J Hicks
(74) *Attorney, Agent, or Firm* — Sorell, Lenna & Schmidt, LLP

(57) ABSTRACT

A plastic, hot-fillable container is provided. The container comprises a blow molded body including a neck and a base having a center portion and a plurality of spaced apart radial segments. At least a portion of each segment is tapered from an outer side to an inner side thereof. Container systems and methods of manufacturing containers are disclosed.

20 Claims, 7 Drawing Sheets

(56) References Cited

U.S. PATENT DOCUMENTS

| | | | |
|---|---|---|---|
| 5,431,291 A * | 7/1995 | LaBombarbe, Jr. | ............................ B65D 1/0246 215/329 |
| 5,829,614 A * | 11/1998 | Collette | .................. B29C 49/12 215/375 |
| 6,123,212 A * | 9/2000 | Russell | .............. B65D 41/0471 215/307 |
| 8,453,866 B2 * | 6/2013 | Kamath | ............... B65D 1/0246 220/288 |
| 8,950,611 B2 * | 2/2015 | Derrien | ................ B65D 79/005 215/373 |
| 2004/0094502 A1 * | 5/2004 | Boukobza | ............ B65D 23/001 215/375 |
| 2005/0260371 A1 * | 11/2005 | Shi | ........................... B29C 49/08 428/35.7 |
| 2006/0255005 A1 * | 11/2006 | Melrose | .................. B65B 63/08 215/381 |
| 2008/0283483 A1 * | 11/2008 | Kim | ....................... B65D 23/02 215/12.2 |
| 2009/0045158 A1 * | 2/2009 | Suriol | ................. B65D 51/1688 215/256 |
| 2009/0321384 A1 * | 12/2009 | Zhang | .................. B65D 79/005 215/383 |
| 2010/0032405 A1 * | 2/2010 | Ozawa | ................. B65D 79/005 215/383 |
| 2017/0057724 A1 * | 3/2017 | Bates | ................. B65D 21/0231 |

* cited by examiner

CONTAINER SYSTEM AND METHOD OF MANUFACTURE

TECHNICAL FIELD

The present disclosure generally relates to blow-molded containers and more particularly to plastic containers capable of high fill temperatures and pasteurization, and methods for making the same for food packaging.

BACKGROUND

Plastic blow-molded containers are commonly used for food packaging products. Many food and beverage products are sold to the consuming public in wide mouth jar-like blow-molded containers. These containers can be made from polyethylene terephythalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

These food packaging containers are adapted to store food packaging products, however, during manufacturing, the containers can deform due to high temperatures employed during fill and pasteurization. This disclosure describes an improvement over these prior art technologies.

SUMMARY

In one embodiment, a plastic, hot-fillable container is provided. The container includes a blow molded body including a neck and a base having a center portion and a plurality of spaced apart radial segments. At least a portion of each segment is tapered from an outer side to an inner side thereof. In some embodiments, container systems and methods of manufacturing containers are disclosed.

In one embodiment, a plastic, hot-fillable food and/or beverage packaging container is provided. The container includes a blow molded body defining a circumferential side wall, a neck and a base including a center portion and a plurality of spaced apart radial segments. At least a portion of each segment is tapered from an outer side to an inner side thereof. The base is movable in an outward and inward orientation relative to the side wall during pressure and vacuum application to prevent the container from deforming.

In one embodiment, a food and/or beverage packaging is provided. The packaging includes a plastic, hot-fillable container comprising a blow molded body including a neck and a base having a center portion and a plurality of spaced apart radial segments. At least a portion of each segment is tapered from an outer side to an inner side thereof. The packaging further includes a metal closure engageable with the neck.

BRIEF DESCRIPTION OF THE DRAWINGS

The present disclosure will become more readily apparent from the specific description accompanied by the following drawings, in which.

DETAILED DESCRIPTION

Figure 1:
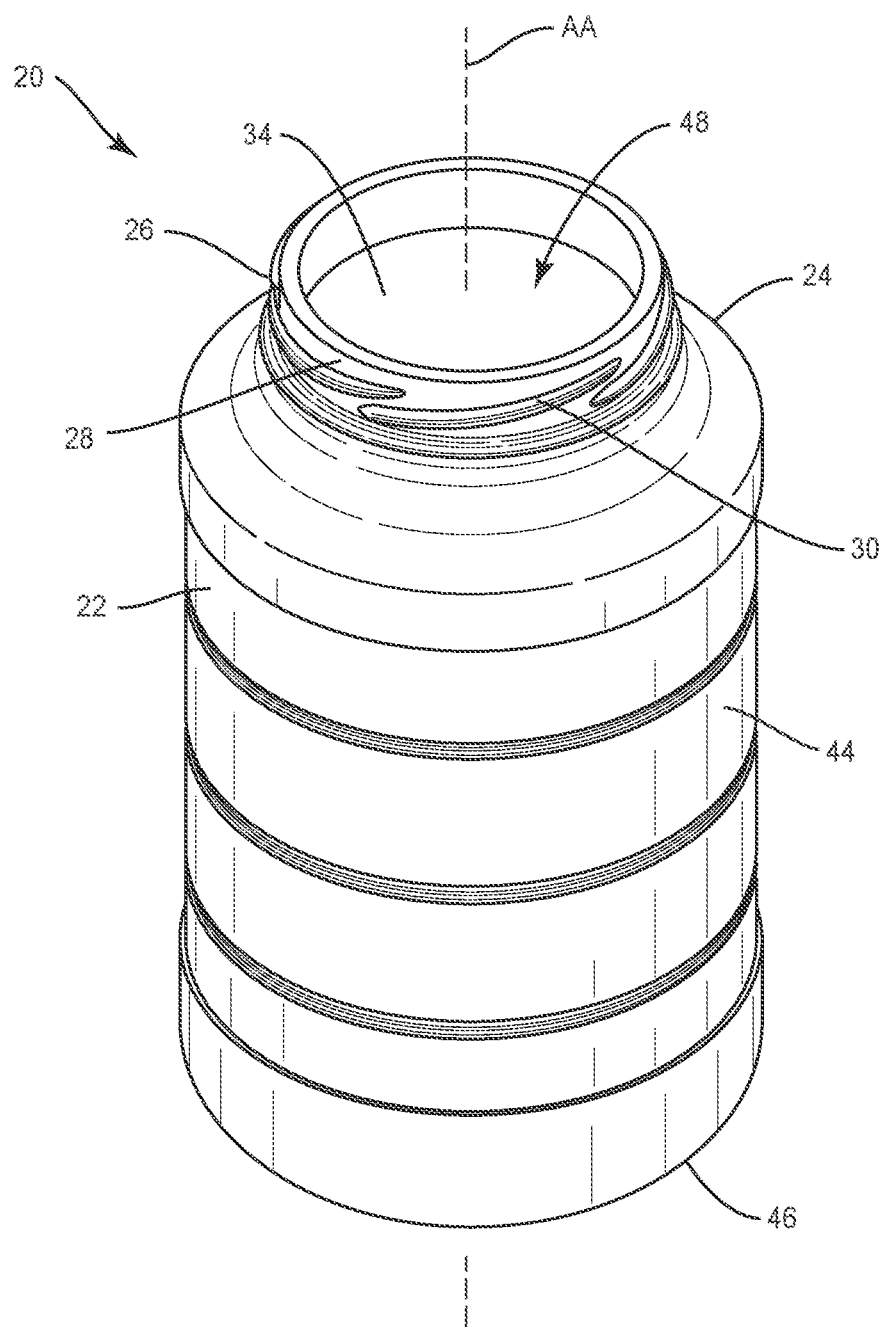
FIG. 1 is a perspective view of one embodiment of a container system in accordance with the principles of the present disclosure.

The exemplary embodiments of blow-molded containers and more particularly, wide mouth polyethylene terephythalate (PET) containers and methods for making the same are discussed in terms of food packaging products. In some embodiments, the present container system includes a container that can be used as a replacement for glass containers. In some embodiments, the present container system includes a container having a 30 or 32 ounce container made from polyethylene terephthalate that can withstand fill and pasteurization temperatures greater than 185° F. In some embodiments, the present container system can be employed with a method of manufacture including pasteurization that can be performed for selected periods of time, for example, 10 minutes under selected temperatures. In some embodiments, the present container system includes a container weighing 42 grams and employed with a method of manufacture including blow molding and trim steps.

In some embodiments, the present container system includes a container defining a flexing base that facilitates movement of the base in an outward orientation when pressure is built up inside of the container immediately after fill and pasteurization. In some embodiments, the flexing base of the container moves in an inward orientation during cooling of the container when a vacuum is created from a food and/or beverage product cooling within the container. In some embodiments, the present container system includes a container defining a push up at a base of the container that does not distort and retains its shape after inward and outward movement of the base. In some embodiments, the present container system includes a container that is capable of withstanding a vacuum pressure configured to pull a safety button on a metal lug cap that is attached to a top of the container. In some embodiments, the present container system includes a container defining a vacuum compensating base with a shaped base geometry. In some embodiments, the present container system includes a container defining a neck with a neck finish configuration that is different than existing containers in the marketplace.

In some embodiments, during manufacture, the present container system can be run on a machine capable of a base-over stroke system. The base-over stroke system can be set at 15 millimeters (mm) to about 25 mm. In some embodiments, the operating temperature of the preform is 115 degrees Celsius to about 125 degrees Celsius and the blow mold temperature is 130 degrees Celsius to about 140 degrees Celsius. In some embodiments, a sidewall of a container of the present container system includes a PET percent crystallinity of 23% to about 32%. In some embodiments, the present container system includes a container that can maintain an initial shape at an elevated pressure of greater than 3 pounds per square inch (psi) and an elevated vacuum of greater than 3 inches of mercury (In Hg).

In some embodiments, the present container system includes a container that is manufactured via an injection molded preform, which is subjected to a blow mold and trim process. In some embodiments, the present container system includes a container that can be filled with food, food preparation oils, viscous and/or beverage products. In some embodiments, the present container system includes a container that can be employed as a cold fill container. In some embodiments, the present container system includes a container that can be employed as a hot fill container. In some embodiments, the present container system includes a container that is employed as a light weight, high strength and barrier food packaging product.

In some embodiments, the present disclosure includes a container system that is employed with a method for manufacturing food packaging having the ability to produce food packages made from PET with minimal weight and selectively desirable physical performance features, as described herein.

In some embodiments, the present container system is manufactured with selective physical performance features, such as, for example, a reduction in plastic weight, a selected pre-form design, selected bottle processing and/or bottle crystallinity of a circumferential side wall of a blown container of the present container system. In some embodiments, the selected physical performance features can include a higher injection molding efficiency and/or cavitation and an increased bi-axial orientation of PET container material. In some embodiments, the present container system includes a container that is manufactured with a smaller diameter preform, which forms a final bottle neck finish through the blowing process that allows for higher injection mold efficiency as well as improved material orientation throughout the container. In some embodiments, the container system includes a container with an improved material distribution and crystalline orientation. In some embodiments, this manufacturing method provides a container system including a container having improved top load, vacuum resistance and/or permeability. In some embodiments, this manufacturing method provides stretching PET to optimum crystalline orientation levels to improve physical performance in top load, vacuum, gas and vapor permeation through the container side wall.

In some embodiments, the present manufacturing method provides PET enhancements via improved material orientation with selective physical performance features, such as, for example, improved top load performance, improved vacuum resistance performance and/or hoop strength, improved oxygen ($O_2$) performance, and improved moisture vapor transmission rate (MVTR) performance.

In some embodiments, the present manufacturing method includes the steps of employing a single stage blow molding process and providing a preform that produces containers having a dome. In some embodiments, the method includes the step of testing the one or more preforms to ensure the one or more preforms include a selected weight and selected neck finish dimension. In some embodiments, the method includes the step of employing the one or more preforms with a four cavity production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of components of a plastic, hot-fillable container system. Alternate embodiments are also disclosed. Reference is made in detail to the exemplary embodiments of the present disclosure, which are illustrated in the accompanying figures. Turning to FIGS. 1-10, there are illustrated components of a plastic, hot-fillable container 20.

Container 20 is configured for storing products such as food, food preparation and/or beverages. Container 20 has a length L1 from about 5 to about 7 inches. In some embodiments, length L1 is about 5.864 inches. Container 20 includes a body 22 that defines a longitudinal axis AA, as shown in FIG. 1. Body 22 includes a circumferential side wall 44 that extends between a top end 24 and a bottom end 46. Body 22 includes a substantially cylindrical configuration. In some embodiments, body 22 may include various configurations, such as, for example, oval, oblong triangular, square, polygonal, irregular, uniform, non-uniform, offset, staggered, and/or tapered. Body 22 may be manufactured by blow molding techniques, as described herein.

Figure 10:
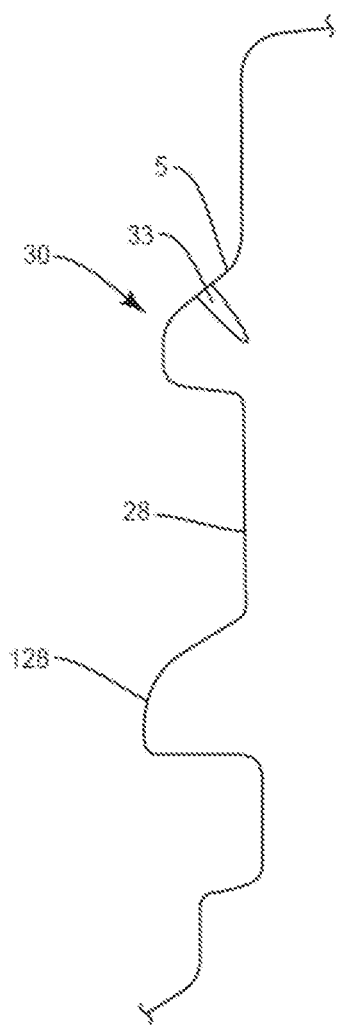
FIG. 10 is a break away side cross section view of components of the container system shown in FIG. 2.

End 24 includes a surface 26. Surface 26 defines a centrally disposed cylindrical neck 28 that includes an outer diameter having threading 30. In some embodiments, a blow mold for threading 30 includes a surface 31 defining at least one cavity, such as, for example, a vent 33. Vents 33 are oriented perpendicular to a top of a surface S of threading 30, as shown in FIG. 10. In some embodiments, vent 33 may be disposed at alternate orientations, relative to surface S, such as, for example, parallel, transverse and/or angular orientations such as acute or obtuse, coaxial and/or may be offset or staggered. Vents 33 are configured to evacuate air trapped between the blow and the plastic as it is being blown.

Figure 2:
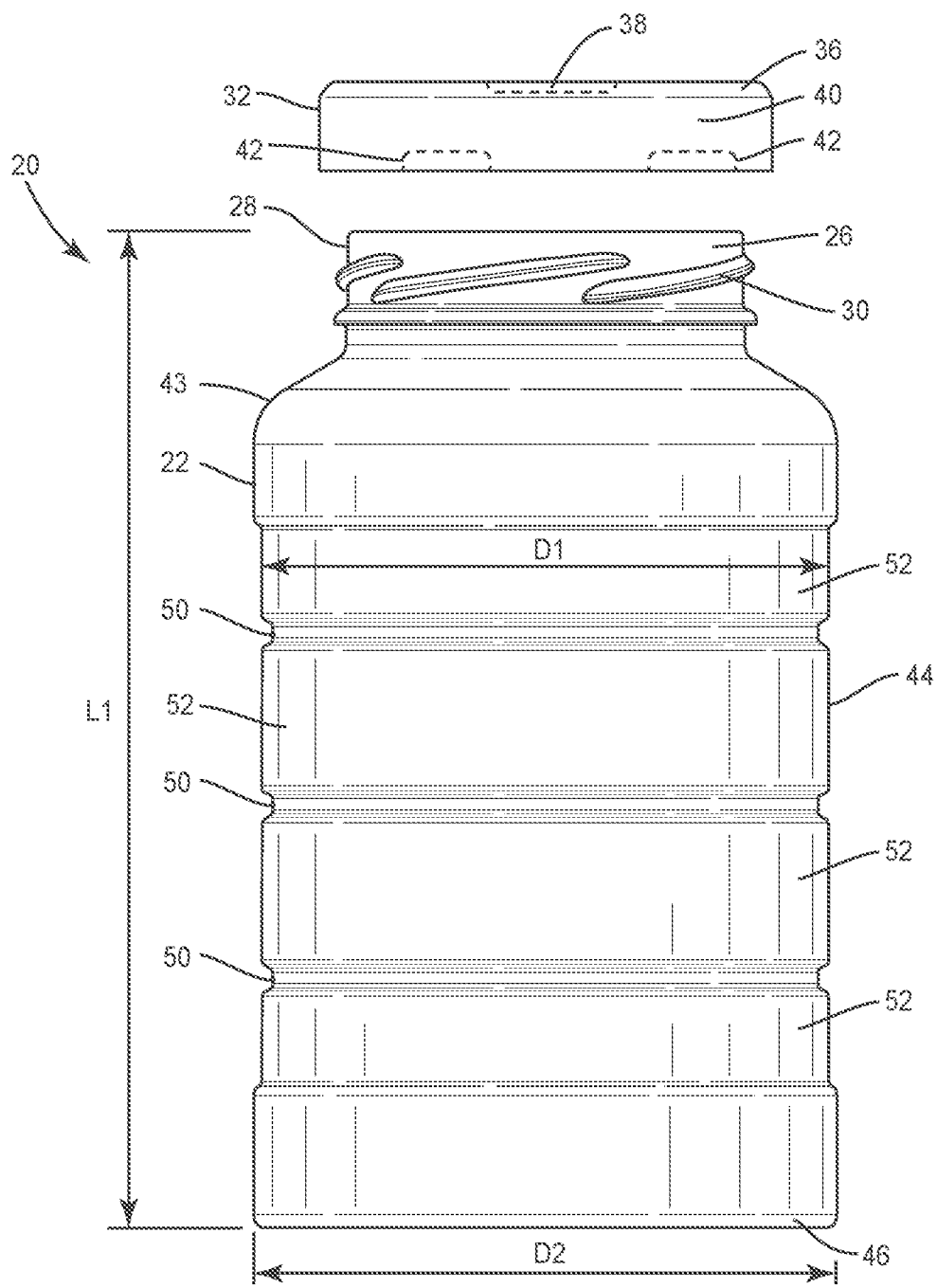
FIG. 2 is a side view of one embodiment of a container system in accordance with the principles of the present disclosure.

Neck 28 is configured for engagement with a metal closure, such as a lid 32, as described herein. Neck 28 defines an opening 34 configured for facilitating filling of container 20. In some embodiments, neck 28 includes a circumferential ring 128, as shown in FIG. 2. Ring 128 is configured to resist and/or prevent neck 28 from distorting and ovalizing as pressure is added to side wall 44 of container 20. For example, if neck 28 becomes distorted, the seal between a gasket of lid 32 and container 20 may be broken. In some embodiments, ring 128 includes a radius of curvature of 0.064. In some embodiment, ring 128 includes a height of 0.106 inches.

Lid 32 includes a surface 36 that defines a centrally disposed tamper resistant element, such as a button 38, as shown in FIG. 2. Button 38 is configured to be deflected in an upward orientation relative to surface 36 to visually indicate that lid 32 has been removed from container 20 and that container 20 has been opened. Deflection of button 38 is caused by a pressure release from within container 20 when lid 32 is disengaged from neck 28. For example, when lid 32 is rotated relative to neck 28, a seal created by neck 28 and lid 32 is released causing a decrease in the pressure within container 20.

Surface 36 of lid 32 defines a circumferential wall 40 that defines a plurality of flanges 42 that are disposed on an inner diameter of lid 32. In some embodiments, lid 32 includes 5 flanges 42. Flanges 42 are disposed transverse relative to wall 40 and are configured for engagement with threading 30 of neck 28. For example, when lid 32 engages with neck 28 and is twisted in a direction, flanges 42 engage with portions of threading 30 to fix lid 32 with neck 28. In some embodiments, flanges 42 are alternatively threading, a ledge, and/or grooves. In some embodiments, surface 36 of lid 32 and/or flanges 42 can be smooth, rough, textured, porous, semi-porous, dimpled, knurled, toothed, raised, grooved and/or polished.

Body 22 includes a circumferential shoulder 43 defined from surface 26 of end 24. Shoulder 43 contacts with wall 44 such that wall 44 extends from end 24 at shoulder 43 to end 46, as shown in FIGS. 1 and 2. Wall 44 is monolithic and is configured to resist deformation during filling of container 20 and/or during pasteurization of food, food preparation and/or beverages disposed within an interior chamber 48. Wall 44 is able to withstand a vacuum draw of greater than 3 In Hg and is also able to withstand an amount of elevated pressure of greater than 3 psi. In some embodiments, wall 44 may include various configurations, such as, for example, oval, oblong triangular, square, polygonal, irregular, uniform, non-uniform, offset, staggered, and/or tapered. Wall 44 has a diameter D1 from about 3 to about 5 inches, as shown in FIG. 2. In some embodiments, diameter D1 is about 3.337 inches. In some embodiments, body 22 includes one or a plurality of walls.

Side wall 44 includes a plurality of circumferential grooves 50 that are disposed perpendicular relative to longitudinal axis AA. Grooves 50 are separated by circumferential segments 52 that are defined from side wall 44.

Grooves 50 are configured to provide flexibility to side wall 44. In some embodiments, grooves 50 may include various configurations, such as, for example, parallel, irregular, uniform, non-uniform, offset, staggered, and/or tapered.

Figure 4:
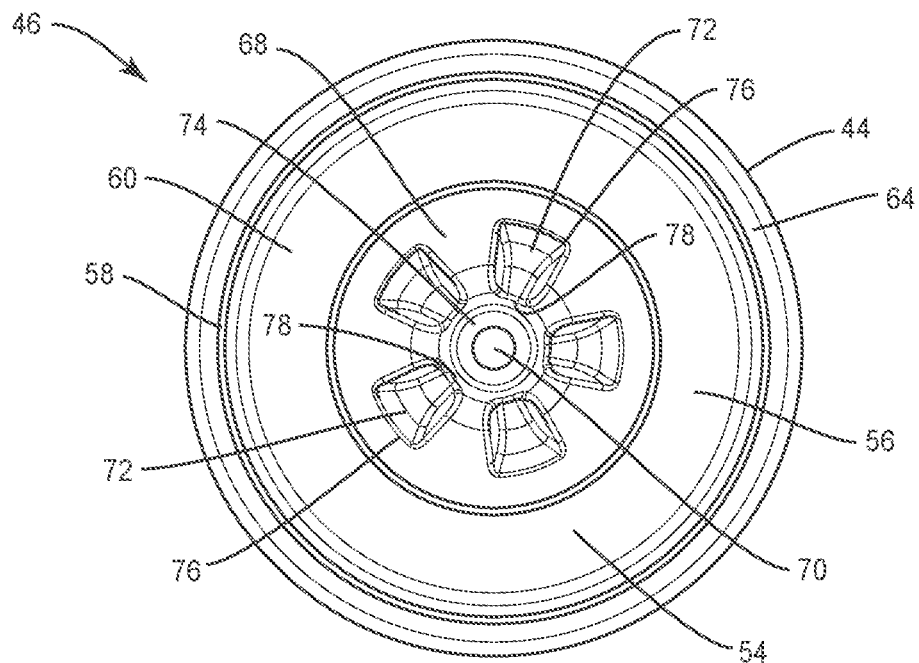
FIG. 4 is a bottom view of the container system shown in FIG. 1.
Figure 5:
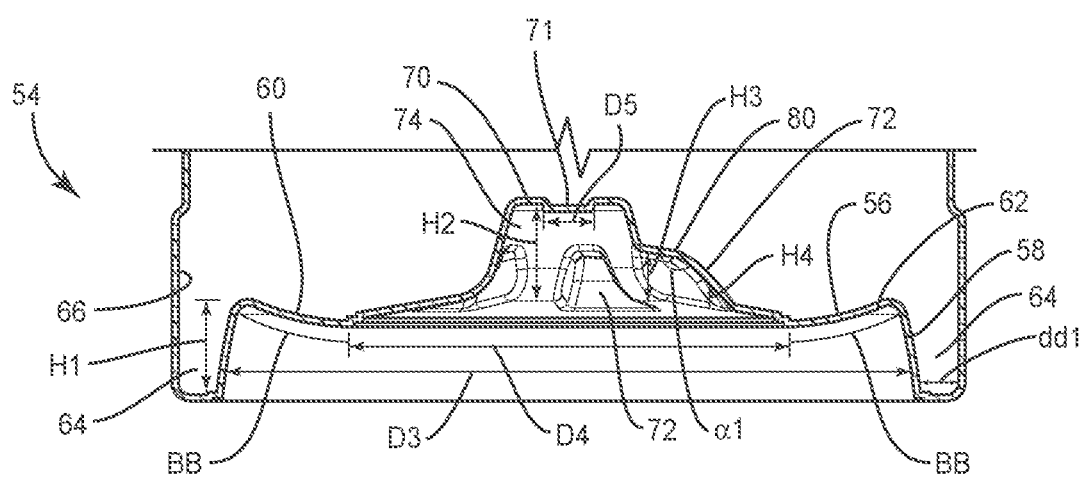
FIG. 5 is a break away side cross section view of components of the container system shown in FIG. 1.

End 46 has a diameter D2 from about 3 to about 5 inches, as shown in FIG. 2. In some embodiments, D2 is about 3.435 inches. End 46 defines a base 54, as shown in FIGS. 4 and 5. Base 54 is configured to compensate for a change in volume inside of interior chamber 48 when interior chamber 48 is filled with food, food preparation and/or beverages or when said food, food preparation and/or beverages are pasteurized after container 20 is filled. Base 54 moves relative to wall 44 in response to pressure changes within interior chamber 48 to decrease and/or increase the volume as needed. For example, base 54 is movable in an outward and/or inward direction relative to wall 44 during pressure and/or vacuum application to prevent container 20 from deforming. For example, during manufacture and/or when a standard container is filled with hot products, a standard container can undesirably deform during pressure and/or vacuum application, distorting the base of the container. In some embodiments, a distorted base hinders the container's ability to stand upright on a shelf.

Base 54 includes a surface 56 that defines a circumferential wall 58 and a shelf 60 that is in direct communication with wall 58. Both wall 58 and shelf 60 extend axially inwardly into interior chamber 48, as shown in FIG. 5. Wall 58 has a maximum height H1 from about 0.1 to about 3.0 inches. In some embodiments, H1 is about 0.414 inches. A gap 64 separates wall 58 from an interior surface 66 of interior chamber 48. Gap 64 distance dd1 is from about 0.1 to about 3.0 inches. In some embodiments, dd1 is about 0.219 inches. Gap 64 prevents wall 58 from rubbing against surface 66 during inward and outer movement of base 54.

Shelf 60 is angled having an arc BB extending from an edge 62 to a centrally disposed circular panel 68, as described below. Shelf 60 has a diameter D3 of about 3.0 to about 3.5 inches.

Shelf 60 of base 54 defines panel 68. Panel 68 moves outwardly and inwardly relative to wall 44 through shelf 60 during pressure and/or vacuum application. Panel 68 has a diameter D4 from about 0.1 to about 3.0 inches. In some embodiments, D4 is about 1.860 inches. Diameter D4 is less than D3.

Figure 3:
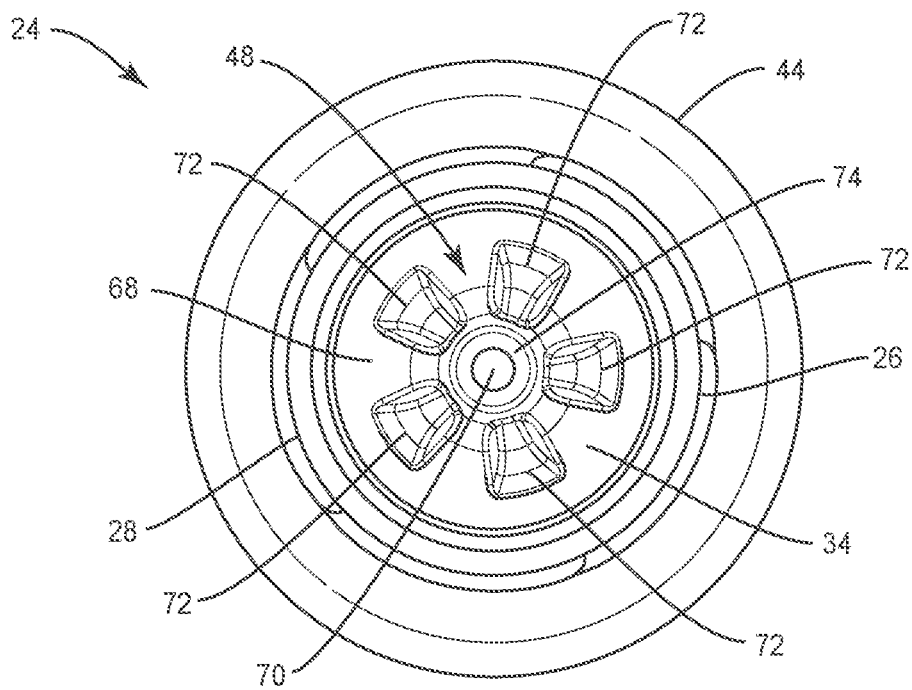
FIG. 3 is a top view of the container system shown in FIG. 1.

Panel 68 includes a circular center portion 70 and a plurality of spaced apart radial segments 72, as shown in FIGS. 3-5. Portion 70 resists deformation when moving inwardly and outwardly on panel 68 relative to container 20 during pressure and/or vacuum application.

Figures 6, 7, 8:
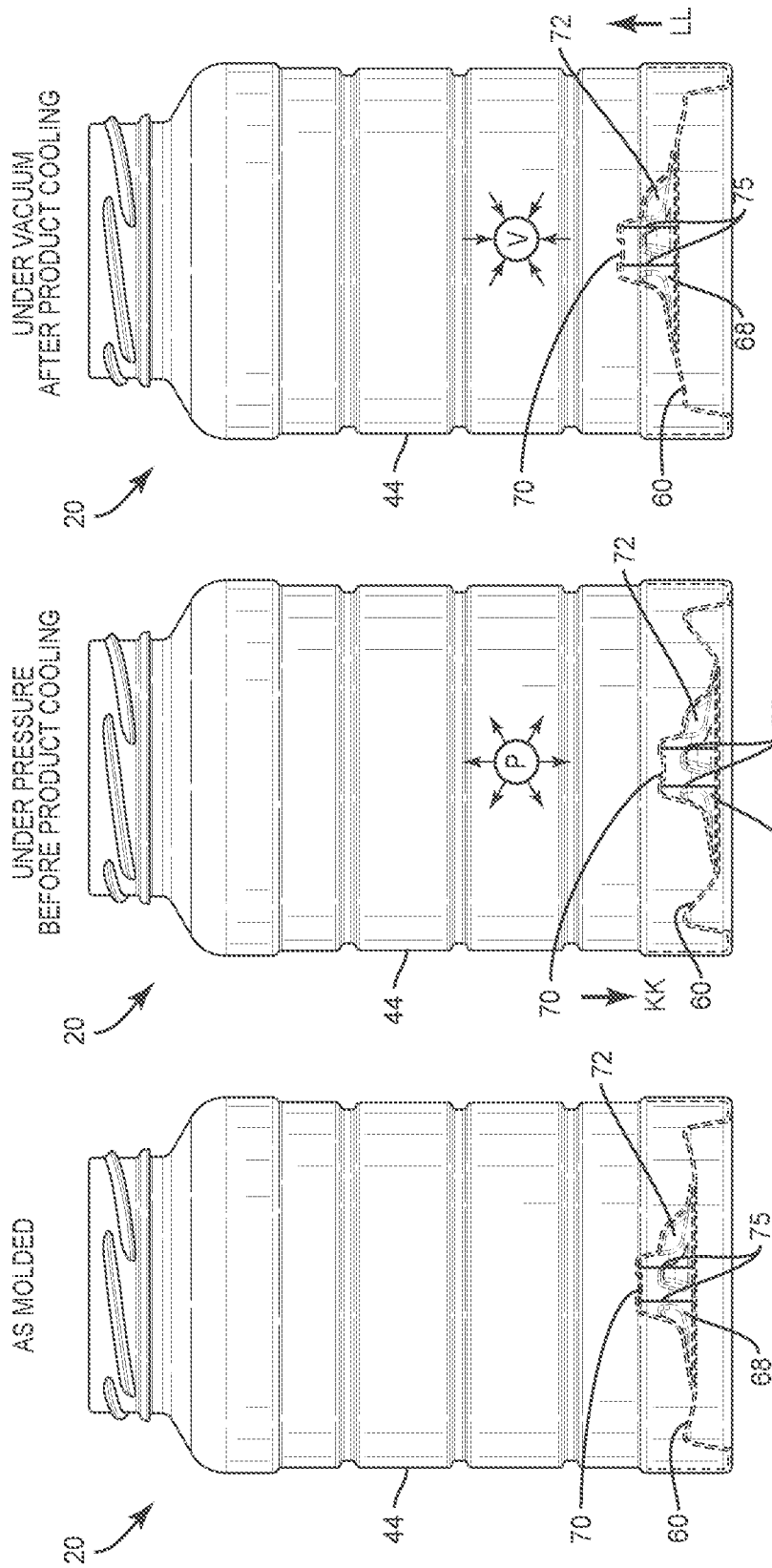
FIG. 6 is a side view of one embodiment of a container system in accordance with the principles of the present disclosure.
FIG. 7 is a side view of one embodiment of a container system in accordance with the principles of the present disclosure.
FIG. 8 is a side view of one embodiment of a container system in accordance with the principles of the present disclosure.

A surface 71 of portion 70 is concave, as shown in FIG. 5. Surface 71 has a diameter D5 from about 0.1 to about 3.0 inches. In some embodiments, D5 is about 0.219 inches. Diameter D5 is less than both D3 and D4. Portion 70 includes a wall 74 that directly communicates with segments 72 to facilitate pressure relief in interior chamber 48. Wall 74 includes a plurality of longitudinal lines or indents 75 disposed between segments 72, as shown in FIGS. 6-8. Lines 75 are configured to impart flexibility to wall 74. Wall 74 has a height H2.

Segments 72 are disposed circumferentially about and directly communicate with portion 70. At least a portion of each segment 72 is tapered from an outer side 76 to an inner side 78, as shown in FIG. 4. A top side 80 of each segment 72 slopes in a downward direction at an angle α1 from inner side 78 to outer side 76, as shown in FIG. 5. The slope causes each segment 72 to have a maximum height H3 at inner side 78 and a minimum height H4 at outer side 76. In some embodiments, base 54 includes one or a plurality of segments 72.

As shown in FIGS. 6-8, prior to filling of container 20, base 54 is in its originally shaped configuration, as shown in FIG. 6. After container 20 is filled with hot products such as food, food preparation and/or beverages or pasteurized products, positive pressure P, which is pressure that is greater than that of the atmosphere, is induced in all directions inside interior chamber 48 of container 20, as shown in FIG. 7. To compensate for pressure change in interior chamber 48, base 54 will move in an outward orientation, as shown by arrow KK in FIG. 7, relative to wall 44. In particular, shelf 60, panel 68, center portion 70 and segments 72 will move in the outward direction, and base 54 will not move beyond end 46 of container 20. After the product is cooled within interior chamber 48, vacuum V is applied in all directions of interior chamber 48 and base 54 will move in an inward direction, as shown by arrow LL in FIG. 8, relative to wall 44. The position of shelf 60, panel 68, center portion 70 and segments 72 will be greater than the configuration of originally shaped base 54, as shown in FIGS. 6 and 8. For example, base 54 and its components will be disposed further within interior chamber 48 than the originally shaped configuration of base 54 is disposed.

Figure 9:
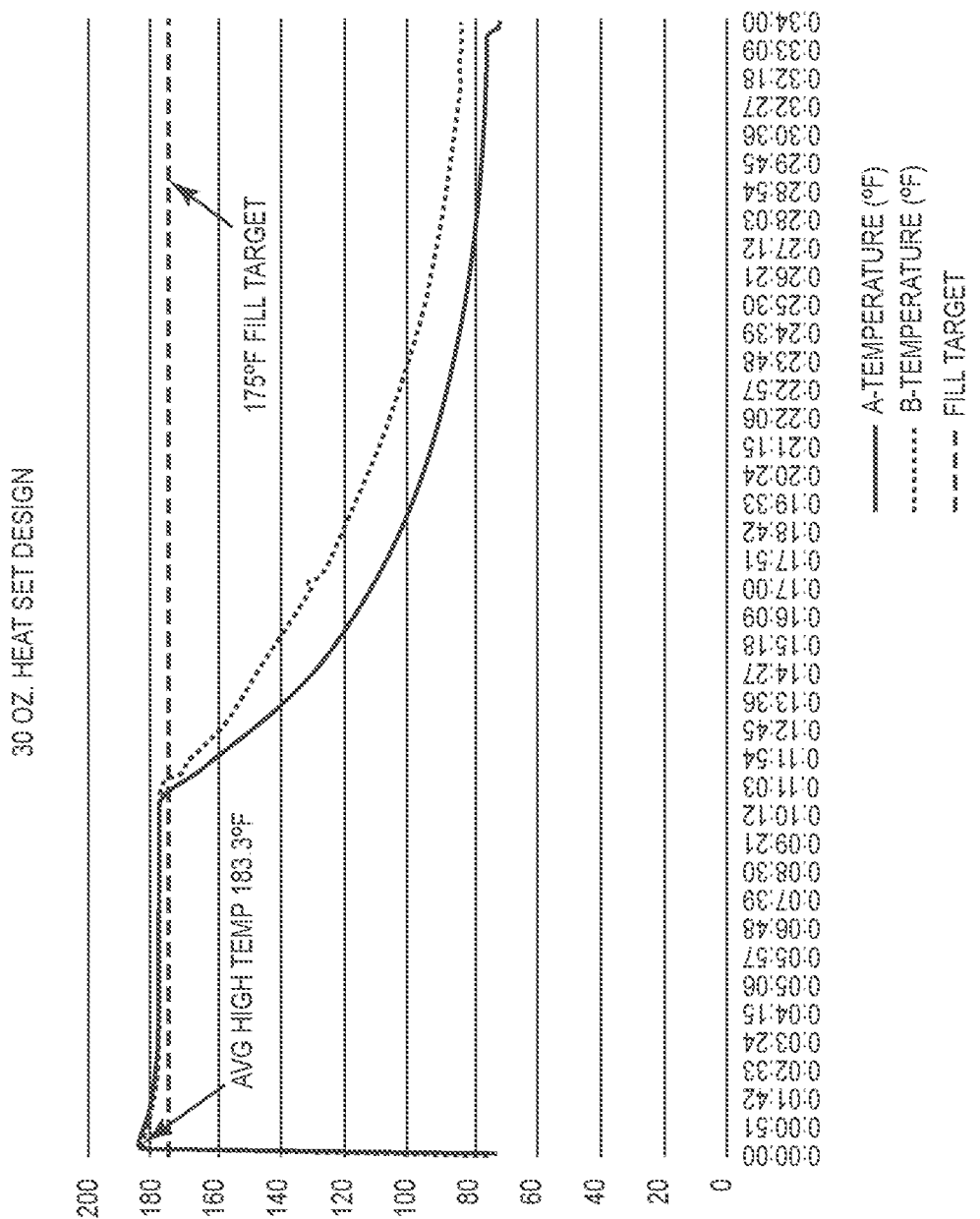
FIG. 9 is a graphical representation of performance of a container system in accordance with the principles of the present disclosure.

FIG. 9 is a graphical representation of performance of the container system. Results show that container 20 can withstand high fill and pasteurization temperatures. For example, a 30-ounce (oz) heat set design of container 20 was filled at an average high temperature of 183.3 degrees Fahrenheit when the fill target was 175 degrees Fahrenheit. In some embodiments, container 20 can withstand fill and pasteurization temperatures greater than 185 degrees Fahrenheit. In some embodiments, container 20 can withstand fill and pasteurization temperatures greater than 185 degrees Fahrenheit to about 220 degrees Fahrenheit.

Container 20 is made from PET. In some embodiments, container 20 may be fabricated from plastic and formed using injection and compression molding processes. In some embodiments, container 20 may be fabricated from polyester (PES), polyethylene (PE), high-density polyethylene (HDPE), polyvinyl chloride (PVC), polyvinylidene chloride (PVDC) (Saran), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), and/or polyurethanes (PU). In some embodiments, container 20, as described herein, can be fabricated from materials suitable for food packaging products. In some embodiments, such materials include synthetic polymers such as thermoplastics, semi-rigid and rigid materials, elastomers, fabric and/or their composites.

Container 20 has a crystallinity from about 23% to about 32%. In some embodiments, a preform of container 20 can be heated and stretched to produce a container 20 having a crystallinity between about 10 and about 50%. In some embodiments, the preform of container 20 includes a molecular weight between about 120,000 g/mol and about 500,000 g/mol.

A finished PET blow-molded, container 20 is constructed for use with a selected application, as described herein. In some embodiments, the selected application includes food, food preparation oils, viscous and/or beverage products.

In some embodiments, the present manufacturing method provides PET enhancements via improved material orientation with selective physical performance features, such as, for example, improved top load performance, improved vacuum resistance performance and/or hoop strength, improved $O_2$ performance and improved MVTR performance.

In some embodiments, the present container system is employed with a method for manufacturing container 20. The method includes the steps of employing a single stage blow molding process and providing a preform that produces containers having base 54 including shelf 60, panel 68, center portion 70 and segments 72. In some embodiments, the method includes injection molding the preform using a two-phase injection system, wherein one phase of the two-phase injection system (e.g., a first phase) comprises injecting material into the preform and another phase of the two-phase injection system (e.g., a second phase) comprises injecting material into the preform to form a layer or multiple layers. The material used in the first phase does not include any additives. In some embodiments, the material used in the first phase is virgin PET without additives and the material used in the second phase is PET and additives. This allows the material that is used in the first phase to be reground as virgin PET so as to avoid regrinding issues discussed above.

In some embodiments, the method further comprises running container 20 on a machine capable of a base-over stroke system. The base-over stroke system is set at 15 mm to about 25 mm. In some embodiments, the operating temperature of the preform is 115 degrees Celsius to about 125 degrees Celsius and the blow mold temperature is 130 degrees Celsius to about 140 degrees Celsius.

In some embodiments, the method includes the step of testing the one or more preforms to ensure the one or more preforms include a selected weight and selected neck finish dimension. In some embodiments, the method includes the step of employing the one or more preforms with a base 54 production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container. In some embodiments, the method includes reusing the dome to produce other containers, such as, for example other wide mouth containers. In some embodiments, reusing the dome includes grinding, blending, drying and adding the dome and adding the ground, blended and dried material to a melt stream, wherein the done does not contain additives.

In some embodiments, shelf 60, panel 68, and center portion 70 are blow molded with segments 72. In some embodiments, segments 72 are manufactured and separately attached, applied and/or adhered to panel 68 of base 54.

In some embodiments, during manufacture, container 20 is filled with food and/or beverage products at a fill site utilizing automated fill equipment. In some embodiments, the food and/or beverage products are hot due to high temperatures in the fill and pasteurization of the products. Positive pressure is induced in all directions inside interior chamber 48 of container 20 when container 20 is filled with the food and/or beverage products. In some embodiments, container 20 is capable of maintaining an initial shape at an elevated pressure of greater than 3 pounds per square inch (psi) and withstands a vacuum draw of greater than 3 In Hg during filling of container 20 with hot food and/or beverage products. During filling of container 20, base 54 is movable in an outward and/or inward direction relative to wall 44 during pressure and/or vacuum application to prevent container 20 from deforming.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A plastic, hot-fillable container comprising:
    a blow molded body including a neck and a base having a center portion and a plurality of spaced apart radial segments, at least a portion of each segment being tapered from an outer side to an inner side thereof, the inner side having a maximum height greater than a maximum height of the outer side, the neck comprising a thread extending outwardly from an outer surface of the neck, the neck comprising at least one closed cavity extending into the thread.

2. A container as recited in claim 1, wherein the neck is engageable with a metal closure having a tamper resistant element.

3. A container as recited in claim 2, wherein the tamper resistant element is centrally disposed on the metal closure.

4. A container as recited in claim 1, wherein the body defines a circumferential wall that resists deformation, and the wall withstands a vacuum draw of greater than 3 in Hg.

5. A container as recited in claim 1, wherein the segments are disposed circumferentially about and directly communicate with the center portion to facilitate pressure relief.

6. A container as recited in claim 1, wherein the center portion includes a wall, the wall directly communicates with the segments to facilitate pressure relief.

7. A container as recited in claim 1, wherein the base is movable in an outward and inward orientation relative to a circumferential wall defined by the body during pressure and vacuum application to prevent the container from deforming.

8. A container as recited in claim 7, wherein the center portion includes a concave configuration configured to resist deformation.

9. A container as recited in claim 1, wherein the container is made from polyethylene terephthalate (PET) and has a crystallinity from about 23% to about 32%.

10. A container as recited in claim 1, wherein the body defines a circumferential wall that resists deformation, and the wall withstands an amount of elevated pressure of greater than 3 pounds per square inch (psi).

11. A plastic, hot-fillable food and/or beverage packaging container comprising:
    a blow molded body defining a circumferential side wall, a neck and a base including a center portion and a plurality of spaced apart radial segments, at least a portion of each segment being tapered from an outer side to an inner side thereof, the inner side having a maximum height greater than a maximum height of the outer side, the neck comprising a thread extending outwardly from an outer surface of the neck, the neck comprising at least one closed cavity extending into the thread;
    wherein the base is movable in an outward and inward orientation relative to the side wall during pressure and vacuum application to prevent the container from deforming.

12. A container as recited in claim 11, wherein the neck is engageable with a metal closure having a tamper resistant element centrally disposed on the metal closure.

13. A container as recited in claim 11, wherein the side wall resists deformation and withstands a vacuum draw of greater than 3 in Hg.

14. A container as recited in claim 11, wherein the segments are disposed circumferentially about and directly communicate with the center portion.

15. A container as recited in claim 11, wherein the center portion includes a concave configuration configured to resist deformation.

16. A container as recited in claim 11, wherein the container is made from polyethylene terephthalate (PET) and has a crystallinity from about 23% to about 32%.

17. A container as recited in claim 11, wherein the side wall withstands an amount of elevated pressure of greater than 3 pounds per square inch (psi).

18. A food and/or beverage packaging comprising:
    a plastic, hot-fillable container comprising a blow molded body extending along a longitudinal axis from a neck to a base, the base having a center portion and a plurality of spaced apart radial segments, at least a portion of each segment being tapered from an outer side to an inner side thereof, the inner side having a maximum height greater than a maximum height of the outer side, the neck comprising a thread extending outwardly from an outer surface of the neck, the neck comprising at least one closed cavity extending into the thread, the at least one closed cavity extending at an acute angle relative to the longitudinal axis; and
    a metal closure engageable with the neck.

19. A packaging as recited in claim 18, wherein the segments are disposed circumferentially about and directly communicate with the center portion to facilitate pressure relief.

20. A packaging as recited in claim 18, wherein the base is movable in an outward and inward orientation relative to a circumferential wall defined by the body during pressure and vacuum application to prevent the container from deforming.

\* \* \* \* \*